(12) United States Patent
Willibald-Ettle et al.

(10) Patent No.: US 12,324,443 B2
(45) Date of Patent: Jun. 10, 2025

(54) ISOMALTULOSE-CONTAINING HARD CARAMELS AND PROCESS FOR PREPARING THE SAME

(71) Applicant: Südzucker AG, Mannheim (DE)

(72) Inventors: Ingrid Willibald-Ettle, Landau (DE); David Richfield, Worms (DE); Jörg Willfahrt, Monsheim (DE); Christina Lutz, Gipf-Oberfrick (CH); Raymond Place, Basel (CH)

(73) Assignee: Südzucker AG, Mannheim (DE)

( * ) Notice: Subject to any disclaimer, the term of this patent is extended or adjusted under 35 U.S.C. 154(b) by 389 days.

(21) Appl. No.: 17/783,397

(22) PCT Filed: Dec. 9, 2020

(86) PCT No.: PCT/EP2020/085316
§ 371 (c)(1),
(2) Date: Jun. 8, 2022

(87) PCT Pub. No.: WO2021/116187
PCT Pub. Date: Jun. 17, 2021

(65) Prior Publication Data
US 2023/0016685 A1    Jan. 19, 2023

(30) Foreign Application Priority Data
Dec. 11, 2019   (DE) .......................... 102019219336.6

(51) Int. Cl.
 A23G 3/42    (2006.01)
 A23G 3/34    (2006.01)
(52) U.S. Cl.
 CPC ............. *A23G 3/42* (2013.01); *A23G 3/0012* (2013.01); *A23G 3/0014* (2013.01); *A23V 2002/00* (2013.01)

(58) Field of Classification Search
 CPC .. A23G 3/0014; A23G 3/0012; A23G 3/0004; A23G 3/42; A23V 2002/00
 USPC .......................................................... 426/660
 See application file for complete search history.

(56) References Cited

U.S. PATENT DOCUMENTS

| 2002/0028276 A1 | 3/2002 | Rapp et al. |
| 2008/0184992 A1 | 8/2008 | Arenz et al. |

FOREIGN PATENT DOCUMENTS

| WO | 0121005 A1 | 3/2001 |
| WO | 2006119991 A1 | 11/2006 |
| WO | 2012092255 A1 | 7/2012 |

OTHER PUBLICATIONS

Chinese Office Action issued by the China Intellectual Property Office in connection with International Application No. 2020800859428, dated Nov. 22, 2023.
International Search Report issued in corresponding International Application No. PCT/EP2020/085316, dated Apr. 15. 2021, pp. 1-2, with English translation.
International Preliminary Report on Patentability issued by the International Bureau of WIPO in connection with International Application No. PCT/EP2020/085316, dated Jun. 23, 2022. English Translation Attached.

*Primary Examiner* — Subbalakshmi Prakash
(74) *Attorney, Agent, or Firm* — Carter, DeLuca & Farrell, LLP; George Likourezos

(57) ABSTRACT

The present invention relates to isomaltulose-containing hard caramels comprising a core and a closed microcrystalline surface layer having a thickness of at most 1 mm, and to processes for preparing isomaltulose-containing hard caramels.

18 Claims, No Drawings

ISOMALTULOSE-CONTAINING HARD CARAMELS AND PROCESS FOR PREPARING THE SAME

CROSS-REFERENCE TO RELATED APPLICATIONS

The present application is the U.S. National Stage of International Application No. PCT/EP2020/085316, filed Dec. 9, 2020, and claims priority to Patent Application No. DE102019219336.6, filed Dec. 11, 2019.

The present invention relates to isomaltulose-containing hard caramels comprising a core and a closed microcrystalline surface layer having a thickness of at most 1 mm, and to processes for preparing isomaltulose-containing hard caramels.

Currently, there are many different sugary and sugar-free hard caramels in various forms on the market. Increasing public interest in healthier alternatives to standard sugary hard caramels, while maintaining the appearance, shelf life and mouthfeel of such hard caramels, has led to the development of a variety of sugar substitute containing hard caramels in recent years.

Isomaltulose (Palatinose®) is a sugar characterised by a reduced glycemic index (GI) compared to sucrose, as well as a consistent long-lasting provision of energy to the body. Chemically, isomaltulose is an α-1,6 glycosidically linked disaccharide of glucose and fructose: 6-O-α-D-glucopyranosyl-D-fructose. Isomaltulose is an isomer of sucrose, which is technically usually obtained from sucrose by enzymatic conversion and is also found in nature in small quantities in honey and sugar cane. The sweetening power of isomaltulose is about 50% of the sweetening power of sucrose. Isomaltulose is also characterised by the fact that it is acariogenic (i.e. does not cause caries). The reason for this is that the bacteria of the oral flora are not able to convert isomaltulose into tooth-damaging acids. In addition, isomaltulose reduces the adhesion of plaque-forming bacteria to the teeth and thus prevents the formation of plaque and tartar.

WO 2006/119991 A1 discloses storage-stable and sensorially particularly attractive hard caramels with an isomaltulose content of more than 50 wt. %.

WO 2012/092255 A1 relates to hard caramels with reduced amount of sugar comprising isomalt, isomaltulose, trehalose and/or erythritol as sugar substitutes.

Prior art processes for preparing hard caramels containing sugar substitutes, in particular isomaltulose, comprise heating the starting solution containing sugar substitutes to above 130° C. Disadvantageously, in the processes known in the prior art, on the one hand there is a chemical change in the starting materials due to the high temperatures used during the manufacturing process and thus a reduced recovery of the sugar substitutes used in the finished product, and on the other hand this chemical change often leads to an undesirable browning/clouding of the hard caramels obtained. Furthermore, it is described in the prior art that isomaltulose disadvantageously crystallises very quickly from a supersaturated solution, with WO 2012/092255 A1 teaching to add, for example, inulin to the solution to prevent crystallisation. Finally, it is peculiar to hard caramels in particular to have low storage stability, especially under adverse environmental conditions, and in particular to absorb water and melt or partially or completely crystallise.

The present invention is based on the technical problem of overcoming the disadvantages of the processes known in the prior art for preparing hard caramels containing isomaltulose. In particular, the technical problem underlying the present invention is also to provide storage-stable hard caramels with a high recovery rate of isomaltulose, which are visually attractive and organoleptically advantageous.

The present invention solves the underlying problem by the subject matter of the independent claims.

The present invention relates to a hard caramel containing isomaltulose in an amount of 50 to 100 wt. %, in particular 60 to 98 wt. %, (each based on total dry substance of the hard caramel), wherein the hard caramel has a core and a closed microcrystalline surface layer with a thickness of at most 1 mm, in particular less than 1 mm, in particular 0.1 to 0.3 mm. The hard caramel according to the invention is thus characterised in particular by the fact that it has a special surface layer, in particular one which is composed of isomaltulose crystals and encloses an otherwise essentially amorphous hard caramel core.

The hard caramels provided according to the invention are characterised by a high storage stability, in particular one characterised by a low water absorption and a low tendency to deliquesce. The hard caramels according to the invention are visually as well as organoleptically attractive and are therefore serious competitors to common hard caramels based on glucose and/or sucrose, which, however, unlike the hard caramels according to the invention, have no added health value.

In the hard caramels according to the present invention, the isomaltulose contained therein is essentially amorphous, the hard caramels having only a thin closed microcrystalline surface layer with a thickness of at most 1 mm, in particular less than 1 mm.

In a particularly preferred embodiment, the closed microcrystalline surface layer has a thickness of 0.01 to 1 mm, in particular 0.05 to 1 mm, in particular 0.1 to 1 mm, in particular 0.15 to 0.9 mm, in particular 0.1 to 0.5 mm, in particular 0.15 to 0.5 mm, in particular 0.1 to 0.3 mm.

In a preferred embodiment of the present invention, the isomaltulose in the core of the hard caramel is not completely crystallised. Preferably, the isomaltulose in the core of the hard caramel is amorphous.

In another preferred embodiment of the present invention, the hard caramel has a transparent core.

Preferably, a hard caramel according to the present invention has no browning, in particular no dark colouring.

In a preferred embodiment of the present invention, the hard caramel according to the invention is characterised by a high storage stability.

Preferably, the hard caramel according to the present invention has a high shape stability.

In a further preferred embodiment of the present invention, the hard caramel is not sticky. Preferably, the hard caramels according to the present invention are non-hygroscopic.

Advantageously, by obtaining non-sticky isomaltulose-containing hard caramels, it is possible to pack them loosely without the individual hard caramels sticking together or to the packaging.

In a preferred embodiment of the present invention, the hard caramel has a residual water content of 1.5 to 3 wt. %, preferably 1.9 to 2.6 wt. % (based on total weight of the hard caramel).

In a particularly preferred embodiment, the hard caramel according to the invention has 50 to 100 wt. %, in particular 60 to 100 wt. %, in particular 65 to 100 wt. %, in particular 70 to 100 wt. %, in particular 80 to 100 wt. %, in particular 85 to 100 wt. %, in particular 90 to 100 wt. %, in particular 95 to 100 wt. % isomaltulose (each based on total dry substance of the hard caramel). In particular, the hard caramel according to the invention has 80 to 100 wt. % isomaltulose (based on total dry substance of the hard caramel).

In a particularly preferred embodiment, the hard caramel according to the invention has 50 to 98 wt. %, in particular 60 to 98 wt. %, in particular 65 to 98 wt. %, in particular 70 to 98 wt. %, in particular 80 to 98 wt. %, in particular 85 to 98 wt. %, in particular 90 to 98 wt. %, isomaltulose (each based on total dry substance of the hard caramel).

In a preferred embodiment of the present invention, the hard caramel according to the invention comprises at least one auxiliary substance or additive. This at least one auxiliary substance or additive is preferably selected from the group consisting of colourants, flavourings, aromas, food-grade acids or acid salts, preservatives, active ingredients, fillers, fats, fat substitutes, oils, binders, dairy products, emulsifiers, intense sweeteners, medically active substances, sugar alcohols, polysaccharides, oligosaccharides, further sugars, mineral salts, in particular salts with $Ca^{2+}$, NaCl, trisodium citrate, salts with phosphate or salts with $Mg^{2+}$.

In a preferred embodiment of the present invention, the hard caramel comprises at least one acid and/or acid salt. Preferably, the hard caramel comprises at least one organic acid, in particular an organic acid selected from the group consisting of citric acid, malic acid, lactic acid, tartaric acid and ascorbic acid.

In another preferred embodiment of the present invention, the hard caramel is free, or substantially free, of acid.

In the context of the present invention, "substantially free" means it has components, in this case free acids and/or acid salts of acids, in such small proportions in each case that the person skilled in the art no longer understands it to mean a hard caramel containing these components.

Preferably, the hard caramel according to the invention has less than 5 wt. %, preferably less than 4 wt. %, preferably less than 3 wt. %, preferably less than 2 wt. %, preferably less than 1 wt. %, preferably less than 0.5 wt. %, preferably less than 0.1 wt. %, preferably less than 0.05 wt. %, preferably less than 0.01 wt. % acid and/or acid salts (each based on total dry substance of the hard caramel).

In a further preferred embodiment of the present invention, the hard caramel is free, in particular substantially free, of fat. In a further embodiment, the hard caramel according to the present invention is free, in particular substantially free, of oil. In both cases, the amount of fat and/or oil in the hard caramel is so low that the person skilled in the art does not assume that the hard caramel contains fat and/or oil. Preferably, the hard caramel according to the invention has less than 5 wt. %, preferably less than 4 wt. %, preferably less than 3 wt. %, preferably less than 2 wt. %, preferably less than 1 wt. %, preferably less than 0.5 wt. %, preferably less than 0.1 wt. %, preferably less than 0.05 wt. %, preferably less than 0.01 wt. %, of fat and/or oil or fat- and/or oil-containing constituents (each based on total dry substance of the hard caramel).

In a preferred embodiment of the present invention, the hard caramel according to the invention has isomaltulose as the sole and only sugar present. In a further preferred embodiment, the hard caramel according to the present invention has isomaltulose as the sole and only body sweetening agent, in particular as the sole and only sweetening agent.

In a preferred embodiment of the present invention, the hard caramel contains at least one further sugar, in particular sucrose, glucose, in particular glucose syrup with dextrose equivalent 40 (DE40), and/or fructose.

In a particularly preferred embodiment of the present invention, the hard caramel has sucrose, glucose or sucrose and glucose in an amount of at most 40 wt. % (based on total dry substance of the hard caramel).

In particular, the hard caramel according to the present invention has sucrose, glucose or sucrose and glucose in an amount of at most 30 wt. %, preferably at most 25 wt. %, preferably at most 25 wt. %, preferably at most 20 wt. %, preferably at most 15 wt. %, preferably at most 10 wt. %, preferably at most 5 wt. % (each based on total dry substance of the hard caramel).

Preferably, the hard caramel according to the present invention has sucrose, glucose or sucrose and glucose in an amount of 2 to 40 wt. %, preferably 5 to 30 wt. %, preferably 7.5 to 27.5 wt. %, preferably 10 to 25 wt. %, preferably 12.5 to 22.5 wt. %, preferably 15 to 20 wt. % (each based on total dry substance of the hard caramel).

Preferably, the hard caramel according to the present invention has sucrose in an amount of at most 40 wt. %, preferably at most 30 wt. %, preferably at most 25 wt. %, preferably at most 20 wt. %, preferably at most 15 wt. %, preferably at most 10 wt. %, preferably at most 5 wt. % (each based on total dry substance of the hard caramel).

Particularly preferably, the hard caramel has sucrose in an amount of 2 to 40 wt. %, preferably 5 to 30 wt. %, preferably 7.5 to 27.5 wt. %, preferably 10 to 25 wt. %, preferably 12.5 to 22.5 wt. %, preferably 15 to 20 wt. % (each based on total dry substance of the hard caramel).

Preferably, the hard caramel according to the present invention has glucose in an amount of at most 40 wt. %, preferably at most 30 wt. %, preferably at most 25 wt. %, preferably at most 20 wt. %, preferably at most 15 wt. %, preferably at most 10 wt. %, preferably at most 5 wt. % (each based on total dry substance of the hard caramel).

Particularly preferably, the hard caramel has glucose in an amount of 2 to 40 wt. %, preferably 5 to 30 wt. %, preferably 7.5 to 27.5 wt. %, preferably 10 to 25 wt. %, preferably 12.5 to 22.5 wt. %, preferably 15 to 20 wt. % (each based on total dry substance of the hard caramel).

Preferably, the hard caramel according to the present invention has fructose in an amount of at most 40 wt. %, preferably at most 30 wt. %, preferably at most 25 wt. %, preferably at most 20 wt. %, preferably at most 15 wt. %, preferably at most 10 wt. %, preferably at most 5 wt. % (each based on total dry substance of the hard caramel).

Particularly preferably, the hard caramel has fructose in an amount of 2 to 40 wt. %, preferably 5 to 30 wt. %, preferably 7.5 to 27.5 wt. %, preferably 10 to 25 wt. %, preferably 12.5 to 22.5 wt. %, preferably 15 to 20 wt. % (each based on total dry substance of the hard caramel).

In a particularly preferred embodiment, the hard caramel has as sole sugars, in particular sucrose and isomaltulose alone, in particular 10 to 40 wt. % sucrose and 60 to 90 wt. % isomaltulose, in particular 20 to 40 wt. % sucrose and 60 to 80 wt. % isomaltulose, in particular 20 to 30 wt. % sucrose and 70 to 80 wt. % isomaltulose (each based on total dry substance of the hard caramel).

In a particularly preferred embodiment, the hard caramel has as sole sugars, in particular glucose and isomaltulose alone, in particular 1 to 15 wt. % glucose and 85 to 99 wt. % isomaltulose, in particular 1 to 10 wt. % glucose and 90 to 99 wt. % isomaltulose, in particular 5 to 10 wt. % glucose and 90 to 95 wt. % isomaltulose (each based on total dry substance of the hard caramel).

In a particularly preferred embodiment, the hard caramel has as sole sugars, in particular sucrose alone, glucose syrup with dextrose equivalent 40 (DE40) and isomaltulose, in particular 15 to 35 wt. % sucrose, 15 to 25 wt. % DE40 and 40 to 70 wt. % isomaltulose, in particular 20 to 30 wt. % sucrose, 20 to 25 wt. % DE40 and 45 to 60 wt. % isomaltulose (each based on total dry substance of the hard caramel).

In a particularly preferred embodiment, the hard caramel has no glucose. In a particularly preferred embodiment, the hard caramel has no sucrose. In a particularly preferred embodiment, the hard caramel has no glucose and no sucrose.

In a preferred embodiment of the present invention, the hard caramel contains at least one polysaccharide in an amount of at most 5 wt. %, preferably at most 4 wt. %, preferably at most 3 wt. %, preferably at most 2 wt. %, preferably at most 1 wt. %, preferably at most 0.5 wt. %, preferably at most 0.2 wt. %, preferably at most 0.1 wt. % (each based on total dry substance of the hard caramel). Preferably, the hard caramel according to the invention does not contain any polysaccharide.

In another preferred embodiment of the present invention, the hard caramel contains at least one oligosaccharide in an amount of at most 5 wt. %, preferably at most 4 wt. %, preferably at most 3 wt. %, preferably at most 2 wt. %, preferably at most 1 wt. %, preferably at most 0.5 wt. %, preferably at most 0.2 wt. %, preferably at most 0.1 wt. % (each based on total dry substance of the hard caramel). Preferably, the hard caramel according to the invention does not contain any oligosaccharide.

Preferably, the hard caramel according to the invention contains no oligosaccharide and no polysaccharide. Particularly preferably, the hard caramel does not contain any oligosaccharide and/or polysaccharide selected from the group consisting of inulin, indigestible dextrin, polydextrose, sucomalt or combinations thereof.

Preferably, the hard caramel according to the invention comprises at least one sugar alcohol. Preferably, the at least one sugar alcohol is selected from the group consisting of isomalt, 1,6-GPS (6-O-α-D-glucopyranosyl-D-sorbitol), 1,1-GPM (1-O-α-D-glucopyranosyl-D-mannitol), 1,1-GPS (1-O-α-D-glucopyranosyl-D-sorbitol), hydrogenated and/or non-hydrogenated starch hydrolysates (HSH), xylitol, sorbitol, erythritol, mannitol, maltitol, lactitol, maltodextrins or mixtures thereof.

Preferably, the hard caramel according to the invention has at least one medically active substance, in particular antihistamines, antibiotics, fungicides, microbiocides, hexylresorcinol, dextromethorphan hydrobromide, menthol, nicotine, caffeine, vitamins, zinc, *eucalyptus*, benzocaine, cetylpyridinium, fluorides, phenylpropanolamine or other pharmaceutically active substances. When used as a medically active hard caramel, the active ingredient may be contained in the hard caramel in an amount of, for example, 1.0 to 15 mg per unit.

In a preferred embodiment of the present invention, the hard caramel comprises at least one flavouring/aroma agent. Particularly preferably, the hard caramel comprises at least one flavouring/aroma agent selected from the group consisting of plant and fruit oils, citrus oils, flower or leaf oils, oils of cherry, strawberry, menthol, *eucalyptus*, peppermint, honey or green mint, fruit essences and green tea extract. Preferably, the hard caramel comprises the at least one flavouring/aroma agent in an amount of 0.05 to 3 wt. % (based on total dry substance of the hard caramel).

In a further preferred embodiment, the hard caramel comprises at least one binder. Preferably, the hard caramel comprises at least one binder selected from the group consisting of alginates, cellulose, gelatin and vegetable gums.

In a further preferred embodiment, the hard caramel according to the invention comprises at least one intense sweetener. Particularly preferably, the hard caramel according to the invention comprises at least one intense sweetener selected from the group consisting of aspartame, cyclamate, acesulfame-K, saccharin, sucralose, glycyrrhizin, monellin, dulcin, naringin, dihydrochalcone, neotame, alitame, neohesperidin DC (dihydrochalcone), steviosides, thaumatin or mixtures thereof.

In a preferred embodiment of the present invention, the hard caramel according to the invention is free of intense sweeteners.

In a preferred embodiment of the present invention, the hard caramel comprises at least one colourant. Preferably, the at least one colourant is a synthetic colourant, in particular selected from the group consisting of erythrosine, indigo carmine, allura red, E171, tartrazine and titanium dioxide. Preferably, the at least one colourant is a natural colourant, in particular selected from the group consisting of carotenoids, for example beta-carotene, riboflavins, chlorophyll, anthocyanins, for example from beetroot, betanin. Preferably, the hard caramel according to the invention comprises the at least one synthetic colourant in an amount of 0.01 to 0.03 wt. % (based on total dry substance of the hard caramel). In another preferred embodiment, the hard caramel according to the invention comprises the at least one natural colourant in an amount of 0.1 to 1 wt. % (based on total dry substance of the hard caramel). Preferably, the hard caramel according to the invention comprises at least one synthetic colourant and at least one natural colourant.

In a preferred embodiment of the present invention, the hard caramel according to the invention is free of colourants.

In a preferred embodiment, the hard caramel according to the present invention comprises at least one milk product, in particular a dairy product, preferably whole milk powder, cream or butter. Preferably, the hard caramel according to the invention comprises the at least one milk product, in particular dairy product, preferably whole milk powder, cream or butter, in an amount of 0 to 9 wt. %, in particular 1 to 8 wt. % (each based on total weight of the hard caramel).

In a further preferred embodiment, the hard caramel according to the invention comprises at least one emulsifier, in particular lecithin, for example soya lecithin. Preferably, the hard caramel according to the invention comprises the at least one emulsifier in an amount of 0 to 5 wt. %, in particular 1 to 4 wt. % (each based on total dry substance of the hard caramel).

The present invention further relates to a process for preparing an isomaltulose-containing hard caramel, comprising the steps of:
a) providing an aqueous medium containing isomaltulose in an amount of 50 to 100 wt. % (based on total dry substance),
b) applying a reduced pressure of at most 0.4 bar with mixing at a temperature of at most 130° C., in particular at most 125° C.,
c) cooling the aqueous medium to a temperature of 70 to 90° C. at atmospheric pressure to obtain a plastic mass, and
d) moulding the plastic mass obtained in step c) and obtaining an isomaltulose-containing hard caramel.

The process according to the invention is characterised in particular by the fact that the aqueous medium provided, in particular the aqueous solution provided, is subjected to a reduced pressure of at most 0.4 bar and a comparatively low temperature of at least 130° C., in particular at most 125° C., in particular at most 110° C., in particular at most 105° C., and wherein this takes place with mixing. The dark colouring of sugar-containing hard caramels which occurs due to excessively high process temperatures can thus be reduced or prevented altogether. According to the invention, storage-stable hard caramels with a low residual water content and a high recovery rate of isomaltulose can thus be provided, which are visually attractive and do not have any undesirable colouring, in particular dark colouring. According to the invention, in particular such a hard caramel with a very thin closed microcrystalline surface layer with a thickness of in particular 0.1 to 0.3 mm can be prepared.

The process according to the invention for preparing an isomaltulose-containing hard caramel thus provides for first preparing an aqueous medium in which isomaltulose is present in an amount of 50 to 100 wt. %, in particular 60 to 98 wt. % (each based on total dry substance). A pressure of at most 0.4 bar at a temperature of at most 130° C. is then applied to the isomaltulose-containing aqueous medium provided in step a). In a particularly preferred embodiment, the aqueous medium is an aqueous solution or an aqueous syrup. In a particularly preferred embodiment, the aqueous medium is an aqueous solution. In a particularly preferred embodiment, the aqueous medium is an aqueous syrup.

In this case, the application of the pressure to the aqueous medium, in particular the aqueous solution, is carried out with mixing, wherein the mixing can be carried out by any suitable means known to the person skilled in the art for mixing aqueous media, in particular aqueous solutions. Particularly preferably, the mixing of the aqueous medium, in particular of the aqueous solution, is continuous during the application of the pressure of at most 0.4 bar to the aqueous medium at a temperature of at most 130° C. Subsequently, in step c), the aqueous medium, in particular the aqueous solution, is cooled to a temperature of 70 to 90° C. at atmospheric pressure, whereby a plastic mass is obtained. Finally, in step d), preferably at a temperature of 70° C. to 90° C., the plastic mass obtained in step c) is formed, in particular stamped, into an isomaltulose-containing hard caramel.

In a particularly preferred embodiment, the mixing in process step b) is continuous, i.e. during the entire duration of process step b). In particular, the mixing in process step b) is carried out in such a way that the isomaltulose-containing aqueous solution is homogeneously mixed, i.e. all isomaltulose molecules have an identical reaction environment.

Without being bound by theory, the process according to the invention leads to a high recovery of isomaltulose, which was present in the aqueous medium provided in step a), in the isomaltulose-containing hard caramel obtained in process step d). Furthermore, a hard caramel obtained from the process according to the invention has an improved appearance, in particular no browning, in particular substantially no browning. In particular, the hard caramels have a, in particular light, yellow colour.

In a preferred embodiment of the present invention, the aqueous medium is an aqueous solution, in particular an aqueous syrup.

In a particularly preferred embodiment, the aqueous medium provided in step a), in particular the aqueous solution or the aqueous syrup, has a dry substance content of 20 to 80 wt. %, in particular 30 to 70 wt. %, in particular 40 to 65 wt. %, in particular 45 to 65 wt. % (each based on total mass of the aqueous medium, in particular the aqueous solution or the aqueous syrup).

In a preferred embodiment of the present invention, the aqueous medium provided in step a), in particular the aqueous solution or the aqueous syrup, contains isomaltulose in an amount of 50 to 100 wt. %, in particular 60 to 100 wt. %, in particular 60 to 100 wt. %, in particular 65 to 100 wt. %, preferably 70 to 100 wt. %, preferably 75 to 100 wt. %, preferably 80 to 100 wt. %, preferably 85 to 100 wt. %, preferably 90 to 100 wt. %, preferably 95 to 100 wt. % (each based on total dry substance).

In a preferred embodiment of the present invention, the aqueous medium provided in step a), in particular the aqueous solution or the aqueous syrup, contains isomaltulose in an amount of 50 to 98 wt. %, in particular 60 to 100 wt. %, in particular 60 to 98 wt. %, in particular 65 to 98 wt. %, preferably 70 to 98 wt. %, preferably 75 to 98 wt. %, preferably 80 to 98 wt. %, preferably 85 to 98 wt. %, preferably 90 to 98 wt. %, preferably 95 to 98 wt. % (each based on total dry substance).

In a preferred embodiment of the present invention, the aqueous medium provided in step a), in particular the aqueous solution or the aqueous syrup, comprises at least one auxiliary substance or additive. This at least one auxiliary substance or additive is preferably selected from the group consisting of colourants, flavourings, aromas, food-grade acids or acid salts, preservatives, active ingredients, fillers, fats, fat substitutes, oils, binders, dairy products, emulsifiers, intense sweeteners, medically active substances, sugar alcohols, polysaccharides, oligosaccharides, further sugars, mineral salts, in particular salts with $Ca^{2+}$, NaCl, trisodium citrate, salts with phosphate or salts with $Mg^{2+}$.

In a preferred embodiment of the present invention, the aqueous medium provided in step a), in particular the aqueous solution or aqueous syrup, comprises at least one acid and/or acid salt. Preferably, the aqueous medium, in particular the aqueous solution or aqueous syrup, comprises at least one organic acid, in particular an organic acid selected from the group consisting of citric acid, malic acid, lactic acid, tartaric acid and ascorbic acid.

In another preferred embodiment of the present invention, the aqueous medium provided in step a), in particular the aqueous solution or aqueous syrup, is free, or substantially free, of acid. That is, it has free acids and/or acid salts of acids in such small proportions in each case that the person skilled in the art no longer understands this to mean an acidic aqueous medium, in particular an aqueous solution or an aqueous syrup. Preferably, the aqueous medium provided in step a), in particular the aqueous solution or the aqueous syrup, has less than 5 wt. %, preferably less than 4 wt. %, preferably less than 3 wt. %, preferably less than 2 wt. %, preferably less than 1 wt. %, preferably less than 0.5 wt. %, preferably less than 0.1 wt. %, preferably less than 0.05 wt. %, preferably less than 0.01 wt. % acid and/or acid salts (each based on total dry substance of the aqueous medium, in particular the aqueous solution or the aqueous syrup).

In a further preferred embodiment of the present invention, the aqueous medium provided in step a), in particular the aqueous solution or the aqueous syrup, is free, in particular substantially free, of fat. In a further embodiment, the aqueous medium provided in step a), in particular the aqueous solution or the aqueous syrup, is free, in particular substantially free, of oil. In both cases, the amount of fat and/or oil in the aqueous medium, in particular the aqueous solution or the aqueous syrup, is so low that the person skilled in the art does not assume that the aqueous medium, in particular an aqueous solution or an aqueous syrup, contains fat and/or oil. Preferably, the aqueous medium provided in step a), in particular the aqueous solution or the aqueous syrup, has less than 5 wt. %, preferably less than 4 wt. %, preferably less than 3 wt. %, preferably less than 2 wt. %, preferably less than 1 wt. %, preferably less than 0.5 wt. %, preferably less than 0.1 wt. %, preferably less than 0.05 wt. %, preferably less than 0.01 wt. %, of fat and/or oil or fat- and/or oil-containing constituents (each based on total dry substance of the aqueous medium, in particular the aqueous solution or the aqueous syrup).

In a preferred embodiment of the present invention, the aqueous medium provided in step a), in particular the aqueous solution or aqueous syrup, has isomaltulose as the sole and only sugar present. In a further preferred embodiment, the aqueous medium provided in step a), in particular the aqueous solution or the aqueous syrup, has isomaltulose as the sole and only occurring body sweetening agent, in particular as the sole and only occurring sweetening agent.

In a preferred embodiment of the present invention, the aqueous medium provided in step a), in particular the aqueous solution or the aqueous syrup, contains at least one further sugar, in particular sucrose, glucose, in particular glucose syrup with dextrose equivalent 40 (DE40), and/or fructose.

In a particularly preferred embodiment of the present invention, the aqueous medium, in particular the aqueous solution or the aqueous syrup, has sucrose, glucose or sucrose and glucose in an amount of at most 40 wt. % (based on total dry substance of the aqueous medium, in particular the aqueous solution or the aqueous syrup).

In particular, the aqueous medium, in particular the aqueous solution or the aqueous syrup, has sucrose, glucose or sucrose and glucose in an amount of at most 30 wt. %, preferably at most 25 wt. %, preferably at most 25 wt. %, preferably at most 20 wt. %, preferably at most 15 wt. %, preferably at most 10 wt. %, preferably at most 5 wt. % (each based on total dry substance of the aqueous medium, in particular the aqueous solution or the aqueous syrup).

Preferably, the aqueous medium, in particular the aqueous solution or the aqueous syrup, has sucrose, glucose or sucrose and glucose in an amount of 2 to 40 wt. %, preferably 5 to 30 wt. %, preferably 7.5 to 27.5 wt. %, preferably 10 to 25 wt. %, preferably 12.5 to 22.5 wt. %, preferably 15 to 20 wt. % (each based on total dry substance of the aqueous medium, in particular the aqueous solution or the aqueous syrup).

Preferably, the aqueous medium provided in step a), in particular the aqueous solution or the aqueous syrup, according to the present invention has sucrose in an amount of at most 40 wt. %, preferably at most 30 wt. %, preferably at most 25 wt. %, preferably at most 20 wt. %, preferably at most 15 wt. %, preferably at most 10 wt. %, preferably at most 5 wt. % (each based on total dry substance of the aqueous medium, in particular the aqueous solution or the aqueous syrup).

Particularly preferably, the aqueous medium provided in step a), in particular the aqueous solution or the aqueous syrup, has sucrose in an amount of 2 to 40 wt. %, preferably 5 to 30 wt. %, preferably 7.5 to 27.5 wt. %, preferably 10 to 25 wt. %, preferably 12.5 to 22.5 wt. %, preferably 15 to 20 wt. % (each based on total dry substance of the aqueous medium, in particular the aqueous solution or the aqueous syrup).

Preferably, the aqueous medium provided in step a), in particular the aqueous solution or the aqueous syrup, according to the present invention has glucose in an amount of at most 40% by weight, preferably at most 30% by weight, preferably at most 25% by weight, preferably at most 20% by weight, preferably at most 15% by weight, preferably at most 10% by weight, preferably at most 5% by weight (each based on total dry substance of the aqueous medium, in particular the aqueous solution or the aqueous syrup).

Particularly preferably, the aqueous medium provided in step a), in particular the aqueous solution or the aqueous syrup, has glucose in an amount of 2 to 40 wt. %, preferably 5 to 30 wt. %, preferably 7.5 to 27.5 wt. %, preferably 10 to 25 wt. %, preferably 12.5 to 22.5 wt. %, preferably 15 to 20 wt. % (each based on total dry substance of the aqueous medium, in particular the aqueous solution or the aqueous syrup).

In a particularly preferred embodiment, the glucose may be in the form of glucose syrup.

Preferably, the aqueous medium provided in step a), in particular the aqueous solution or the aqueous syrup, according to the present invention has fructose in an amount of at most 40 wt. %, preferably at most 30 wt. %, preferably at most 25 wt. %, preferably at most 20 wt. %, preferably at most 15 wt. %, preferably at most 10 wt. %, preferably at most 5 wt. % (each based on total dry substance of the aqueous medium, in particular the aqueous solution or the aqueous syrup).

Particularly preferably, the aqueous medium provided in step a), in particular the aqueous solution or the aqueous syrup, has fructose in an amount of 2 to 40 wt. %, preferably 5 to 30 wt. %, preferably 7.5 to 27.5 wt. %, preferably 10 to 25 wt. %, preferably 12.5 to 22.5 wt. %, preferably 15 to 20 wt. % (each based on total dry substance of the aqueous medium, in particular the aqueous solution or the aqueous syrup).

Particularly preferably, the aqueous medium provided in step a), in particular the aqueous solution or the aqueous syrup, has as sole sugars, in particular sucrose and isomaltulose alone, in particular 10 to 40 wt. % sucrose and 60 to 90 wt.-% isomaltulose, in particular 20 to 40 wt. % sucrose and 60 to 80 wt. % isomaltulose, in particular 20 to 30 wt. % sucrose and 70 to 80 wt. % isomaltulose (each based on total dry substance of the aqueous medium, in particular the aqueous solution or the aqueous syrup).

Particularly preferably, the aqueous medium provided in step a), in particular the aqueous solution or the aqueous syrup, has as sole sugars, in particular glucose and isomaltulose alone, in particular 1 to 15 wt. % glucose and 85 to 99 wt. % isomaltulose, in particular 1 to 10 wt. % glucose and 90 to 99 wt. % isomaltulose, in particular 5 to 10 wt. % glucose and 90 to 95 wt. % isomaltulose (each based on total dry substance of the aqueous medium, in particular the aqueous solution or the aqueous syrup).

Particularly preferably, the aqueous medium provided in step a), in particular the aqueous solution or the aqueous syrup, has as sole sugars, in particular sucrose alone, glucose syrup with dextrose equivalent 40 (DE40) and isomaltulose, in particular 15 to 35 wt. % sucrose, 15 to 25 wt. % DE40 and 40 to 70 wt. % isomaltulose, in particular 20 to 30 wt. % sucrose, 20 to 25 wt. % DE40 and 45 to 60 wt. % isomaltulose (each based on total dry substance of the aqueous medium, in particular the aqueous solution or the aqueous syrup).

Particularly preferably, the aqueous medium provided in step a), in particular the aqueous solution or the aqueous syrup, has no glucose. Particularly preferably, the aqueous medium provided in step a), in particular the aqueous solution or the aqueous syrup, has no sucrose. Particularly preferably, the aqueous medium provided in step a), in particular the aqueous solution or the aqueous syrup, has no glucose and no sucrose.

In a preferred embodiment of the present invention, the aqueous medium provided in step a), in particular the aqueous solution or the aqueous syrup, contains at least one polysaccharide in an amount of at most 5 wt. %, preferably at most 4 wt. %, preferably at most 3 wt. %, preferably at most 2 wt. %, preferably at most 1 wt. %, preferably at most 0.5 wt. %, preferably at most 0.2 wt. %, preferably at most 0.1 wt. % (each based on total dry substance of the aqueous medium, in particular the aqueous solution or the aqueous syrup). Preferably, the aqueous medium provided in step a), in particular the aqueous solution or the aqueous syrup, does not contain any polysaccharide.

In a further preferred embodiment of the present invention, the aqueous medium provided in step a), in particular the aqueous solution or the aqueous syrup, contains at least one oligosaccharide in an amount of at most 5 wt. %, preferably at most 4 wt. %, preferably at most 3 wt. %, preferably at most 2 wt. %, preferably at most 1 wt. %, preferably at most 0.5 wt. %, preferably at most 0.2 wt. %, preferably at most 0.1 wt. % (each based on total dry substance of the aqueous medium, in particular the aqueous solution or the aqueous syrup). Preferably, the aqueous medium provided in step a), in particular the aqueous solution or the aqueous syrup, does not contain any oligosaccharide.

Preferably, the aqueous medium provided in step a), in particular the aqueous solution or the aqueous syrup, does not contain any oligosaccharide or polysaccharide. Particularly preferably, the aqueous medium provided in step a), in particular the aqueous solution or aqueous syrup, does not contain any oligosaccharide and/or polysaccharide selected from the group consisting of inulin, indigestible dextrin, polydextrose, sucomalt or combinations thereof.

Preferably, the aqueous medium provided in step a), in particular the aqueous solution or aqueous syrup, comprises at least one sugar alcohol. Preferably, the at least one sugar alcohol is selected from the group consisting of isomalt, 1,6-GPS, 1,1-GPM, 1,1-GPS, hydrogenated and/or non-hydrogenated starch hydrolysates (HSH), xylitol, sorbitol, erythritol, mannitol, maltitol, lactitol, maltodextrins or mixtures thereof.

Preferably, the aqueous medium provided in step a), in particular the aqueous solution or the aqueous syrup, has at least one medically active substance, in particular antihistamines, antibiotics, fungicides, microbiocides, hexylresorcinol, dextromethorphan hydrobromide, menthol, nicotine, caffeine, vitamins, zinc, *eucalyptus*, benzocaine, cetylpyridinium, fluorides, phenylpropanolamine or other pharmaceutically active substances. In the preparation of a medically active hard caramel, the active substance may be contained in the aqueous medium, in particular the aqueous solution or aqueous syrup, in an amount of, for example, 1.0 to 15 mg per unit.

In a preferred embodiment of the present invention, the aqueous medium provided in step a), in particular the aqueous solution or the aqueous syrup, comprises at least one flavouring/aroma agent. Particularly preferably, the aqueous medium provided in step a), in particular the aqueous solution or aqueous syrup, comprises at least one flavouring/aroma agent selected from the group consisting of plant and fruit oils, citrus oils, flower or leaf oils, oils of cherry, strawberry, menthol, *eucalyptus*, peppermint, honey or green mint, fruit essences and green tea extract. Preferably, the aqueous medium provided in step a), in particular the aqueous solution or aqueous syrup, comprises the at least one flavouring/aroma agent in an amount of 0.05 to 3 wt. % (based on total dry substance of the aqueous medium, in particular the aqueous solution or aqueous syrup).

In a further preferred embodiment, the aqueous medium provided in step a), in particular the aqueous solution or aqueous syrup, comprises at least one binder. Preferably, the aqueous medium provided in step a), in particular the aqueous solution or the aqueous syrup, comprises at least one binder selected from the group consisting of alginates, cellulose, gelatine and vegetable gums.

In a further preferred embodiment, the aqueous medium provided in step a), in particular the aqueous solution or aqueous syrup, comprises at least one intense sweetener. Particularly preferably, the aqueous medium provided in step a) comprises at least one intense sweetener selected from the group consisting of aspartame, cyclamate, acesulfame-K, saccharin, sucralose, glycyrrhizin, monellin, dulcin, naringin, dihydrochalcone, neotame, alitame, neohesperidin DC (dihydrochalcone), steviosides, thaumatin or mixtures thereof.

In a preferred embodiment of the present invention, the aqueous medium provided in step a), in particular the aqueous solution or aqueous syrup, is free of intense sweeteners.

In a preferred embodiment of the present invention, the aqueous medium provided in step a), in particular the aqueous solution or the aqueous syrup, comprises at least one colourant. Preferably, the at least one colourant is a synthetic colourant, in particular selected from the group consisting of erythrosine, indigo carmine, allura red, E171, tartrazine and titanium dioxide. Preferably, the at least one colourant is a natural colourant, in particular selected from the group consisting of carotenoids, for example beta-carotene, riboflavins, chlorophyll, anthocyanins, for example from beetroot, betanin. Preferably, the aqueous medium provided in step a), in particular the aqueous solution or aqueous syrup, comprises the at least one synthetic colourant in an amount of 0.01 to 0.03 wt. % (based on total dry substance of the aqueous medium). In a further preferred embodiment, the aqueous medium provided in step a), in particular the aqueous solution or the aqueous syrup, comprises the at least one natural colourant in an amount of 0.1 to 1 wt. % (based on total dry substance of the aqueous medium). Preferably, the aqueous medium provided in step a), in particular the aqueous solution or aqueous syrup, comprises at least one synthetic colourant and at least one natural colourant.

In a preferred embodiment of the present invention, the aqueous medium provided in step a) is free of colourants.

In a preferred embodiment, the aqueous medium provided in step a), in particular the aqueous solution or aqueous syrup, comprises at least one dairy product, in particular a dairy product, preferably whole milk powder, cream or butter. Preferably, the aqueous medium provided in step a) comprises the at least one milk product, in particular dairy product, preferably whole milk powder, cream or butter, in an amount of 0 to 9 wt. %, in particular 1 to 8 wt. % (each based on total weight of the aqueous medium, in particular the aqueous solution or the aqueous syrup).

In a further preferred embodiment, the aqueous medium provided in step a), in particular the aqueous solution or the aqueous syrup, comprises at least one emulsifier, in particular lecithin, for example soya lecithin. Preferably, the aqueous medium provided in step a), in particular the aqueous solution or the aqueous syrup, comprises the at least one emulsifier in an amount of 0 to 5 wt. %, in particular 1 to 4 wt. % (each based on total dry substance of the aqueous medium, in particular the aqueous solution or the aqueous syrup).

In a further preferred embodiment of the present invention, the aqueous medium provided in step a), in particular the aqueous solution or the aqueous syrup, is heated to a temperature of at most 130° C., in particular at most 125° C., in particular at most 100° C., before step b) in a process step a1). Particularly preferably, the aqueous medium provided in step a), in particular the aqueous solution or the aqueous syrup, is heated before step b) in a process step a1) to a temperature of 80 to 125° C., in particular 80 to 100° C., preferably 85 to 95° C.

Preferably, process step a1) serves to dissolve any isomaltulose present in solid form in the aqueous syrup.

Preferably, the heating of the aqueous medium provided in step a), in particular the aqueous solution or the aqueous syrup, is carried out before step b) in a process step a1) under atmospheric pressure.

In a preferred embodiment of the present invention, in step b) the temperature is at most 125° C., in particular at most 120° C., in particular at most 110° C., in particular at most 105° C.

In a preferred embodiment of the present invention, in step b) the temperature is 110 to 130° C., in particular 120 to 125° C., in particular 110 to 120° C., in particular 100 to 120° C.

In a preferred embodiment of the present invention, the pressure in step b) is in a range of 0.1 to 0.4 bar, preferably 0.15 to 0.4 bar, preferably 0.2 to 0.4 bar, preferably 0.25 to 0.4 bar, preferably 0.3 to 0.4 bar.

Preferably, the pressure in step b) is at most 0.38 bar, preferably at most 0.36 bar, preferably at most 0.34 bar, preferably at most 0.32 bar, preferably at most 0.3 bar, preferably at most 0.28 bar, preferably at most 0.26 bar, preferably at most 0.24 bar, preferably at most 0.22 bar.

In a particularly preferred embodiment of the present invention, the duration of the process step b) is 5 to 30 min, in particular 7 to 28 min, in particular 8 to 27 min, in particular 5 to 25 min, in particular 9 to 25 min.

In a preferred embodiment of the present invention, the mixing in step b) is continuous.

In a particularly preferred embodiment of the present invention, the cooling is a passive cooling. According to this embodiment, it may be provided that the aqueous medium present at a certain temperature in step b) is cooled by not applying heat, for example by leaving it standing at room temperature or by storing or transporting it on a cooling table or cooling belt. In another embodiment of the present invention, the cooling may also be an active cooling using cooling means.

In another preferred embodiment of the present invention, the cooling of the aqueous medium in step c) is carried out to a temperature of 72 to 88° C., preferably 74 to 86° C., preferably 76 to 84° C., preferably 78 to 82° C., preferably 80° C.

In a preferred embodiment of the present invention, the plastic mass obtained in step c) has a water content of 1 to 4%, preferably 1.5 to 2.5%, more preferably 1.8 to 2.5%.

In another preferred embodiment of the present invention, the plastic mass obtained in step c) has a water content of at most 4%, preferably at most 3.9%, preferably at most 3.8%, preferably at most 3.7%, preferably at most 3.6%, preferably at most 3.5%, preferably at most 3.4%, preferably at most 3.3%, preferably at most 3.2%, preferably at most 3.1%, preferably at most 3, 0%, preferably at most 2.9%, preferably at most 2.8%, preferably at most 2.7%, preferably at most 2.6%, preferably at most 2.5%, preferably at most 2.4%, preferably at most 2.3%, preferably at most 2.2%, preferably at most 2.1%, preferably at most 2.0%, preferably at most 1.9%, preferably at most 1.8%, preferably at most 1.7%, preferably at most 1.6%, preferably at most 1.5%.

In a particularly preferred embodiment, the present invention relates to a process for preparing an isomaltulose-containing hard caramel, comprising the steps of:
a) providing an aqueous medium containing isomaltulose in an amount of 50 to 100 wt. % (based on total dry substance),
b) applying a reduced pressure of 0.1 to 0.4 bar with continuous mixing to the aqueous medium at a temperature of at most 125° C., in particular at most 120° C., for a duration of 5 to 30 minutes,
c) cooling the aqueous medium to a temperature of 70 to 90° C. at atmospheric pressure to obtain a plastic mass, and
d) moulding the plastic mass obtained in step c) and obtaining an isomaltulose-containing hard caramel characterised by a microcrystalline boundary layer having a thickness of 0.1 to 0.3 mm.

The present invention further relates to a hard caramel preparable, in particular prepared, according to the process for preparing an isomaltulose-containing hard caramel according to the invention.

In a preferred embodiment of the present invention, the hard caramel according to the invention, in particular the hard caramel producible, in particular produced, according to the process according to the invention, has a recovery of the isomaltulose originally used of at least 90%, preferably at least 91%, preferably at least 92%, preferably at least 93%, preferably at least 94%, preferably at least 95%, preferably at least 96%, preferably at least 97%, preferably at least 98%, preferably at least 99%, preferably 100%.

In the context of the present invention, weight percentages (wt. %) always refers to total dry substance of the hard caramel, unless otherwise indicated.

In the context of the present invention, the term "hard caramel" refers to an substantially amorphous, glass-like product.

In the context of the present invention, the core of the hard caramel is understood to be the region of the hard caramel not formed by the thin closed microcrystalline surface layer. The hard caramel according to the present invention therefore comprises essentially two regions, namely a thin closed microcrystalline surface layer of isomaltulose crystals and a non-crystallised core containing isomaltulose.

In the context of the present invention, a "plastic mass" refers to a deformable mass.

In the context of the present invention, the term "cooling" refers to a reduction in temperature. In this context, the term comprises both active cooling, in particular by the active removal of thermal energy, and passive cooling, in particular "allowing to cool".

In the context of the present invention, the term "disaccharide" is understood to mean a carbohydrate which is composed of two monosaccharides, the two monosaccharides being linked together by a glycosidic bond.

According to the invention, the term "oligosaccharide" is understood to mean a carbohydrate which is composed of three to ten monosaccharides, the individual monosaccharides being linked together by glycosidic bonds.

According to the invention, the term "polysaccharide" means a carbohydrate which is composed of more than ten monosaccharides, the individual monosaccharides being linked together by glycosidic bonds.

In the context of the present invention, "recovery" is understood to mean the percentage of a substance, in particular the percentage of the carbohydrates originally used, preferably the percentage of the isomaltulose originally used, which is chemically unchanged in the hard caramel after carrying out the process according to the invention, in particular after preparing the hard caramel according to the invention. Accordingly, a high "recovery" means that no or only a slight chemical change of the substances concerned, in particular the carbohydrates originally used, preferably the isomaltulose originally used, has taken place during the preparing process, in particular that only a small proportion of the substances originally used in the process has been chemically changed and the predominant proportion of the substances is chemically unchanged in the hard caramel.

In the context of the present invention, a high storage stability according to the invention is preferably present if, in a storage test over three days at 30° C. and 70% relative humidity (rH), a weight increase of at most 5 wt. %, in particular at most 4 wt. %, in particular at most 3.5 wt. %, in particular at most 2 wt. %, in particular at most 1.5 wt. %, in particular at most 1 wt. % (each based on total mass) occurs.

In the context of the present invention, the terms "comprising" and "having" are understood to mean that, in addition to the elements explicitly covered by these terms, further elements not explicitly mentioned may be added. In the context of the present invention, it is also understood by these terms that only the explicitly mentioned elements are covered and that no further elements are present. In this particular embodiment, the meaning of the terms "comprising" and "having" is synonymous with the term "consisting of". In addition, the terms "comprising" and "having" also cover compositions which, in addition to the explicitly mentioned elements, also comprise further elements which are not mentioned but which are of a functionally and qualitatively subordinate nature. In this embodiment, the terms "comprising" and "having" are synonymous with the term "consisting essentially of".

In the context of the present invention, the term "and/or" is understood to mean that all members of a group connected by the term "and/or" are disclosed cumulatively in any combination, both alternatively to each other and respectively to each other. This means for the expression "A, B and/or C" that the following disclosure is to be understood thereunder: a) A or B or C or b) (A and B) or c) (A and C) or d) (B and C) or e) (A and B and C).

Where, in the context of the present invention, the first and second decimal places or the second decimal place is/are not indicated for a number, it/they shall be set as zero.

Where, in the context of the present invention, quantitative indications, in particular percentages, of components of a product or of a composition are indicated, these add up to 100% of the composition and/or of the product together with the other explicitly indicated or expertly apparent further components of the composition or of the product, unless explicitly indicated otherwise or expertly apparent.

Where in the context of the present invention a "presence", a "containing" or a "having" of a component in an amount of 0 wt. % is explicitly mentioned or implied, this means that the respective component is not present, in particular not present, in a measurable amount.

Further preferred embodiments are apparent from the subclaims.

The invention is described below without limiting the general idea of the invention by means of exemplary figures and embodiments.

EXAMPLE 1

2 kg of isomaltulose and 0.8 kg of demineralised water were weighed out in a batch digester (corresponds to 71 wt. % dry substance content) (process step a)). This aqueous medium containing isomaltulose was heated to 125° C. at atmospheric pressure (process step a1)). Subsequently, a pressure of 0.2 bar was applied to the aqueous solution containing isomaltulose thus obtained, whereby the solution was cooled to 100° C. by applying this pressure. This solution was heated to 105° C. under continuous mixing at a pressure of 0.2 bar (process step b)).

After boiling down, the applied vacuum was removed, i.e. atmospheric pressure was set, the batch cooker was emptied and the cooked plastic mass was cooled to 70 to 80° C. on a steel table (process step c)).

The resulting mass was stamped into hard caramels by means of rollers (process step d)).

EXAMPLE 2

The hard caramels indicated in Table 1 below were prepared according to the process indicated in Example 1 with the temperature, pressure and duration of process step b) indicated in Table 2 below. In the case of a mixture of isomaltulose and a syrup, when the ratio between the two is given, it refers to the dry substance, i.e. the dry substance content after mixing the isomaltulose, syrup and water, if any, into an aqueous medium.

Trials 1, 2, 3 and 18 are reference examples not according to the invention, in which compositions not according to the invention, as in trials 1 to 3, or process parameters not according to the invention, as in trial 18 (increased temperature, no reduced pressure), were used.

TABLE 1

| | | Recipes | | | |
|---|---|---|---|---|---|
| trial | designation | glucose syrup | isomaltulose | sucrose | added water |
| 1 | Reference glucose/sucrose | 2367 | | 2367 | 500 |
| 2 | 30% isomaltulose 20% sucr. 50% syrup (EHM) | 2496 | 1200 | 800 | 400 |
| 3 | 30% isomaltulose 35% sucr. 35% syrup (EHM) | 1600 | 1200 | 1600 | 800 |
| 4 | 100% isomaltulose | | 5000 | | 2000 |
| 5 | 100% isomaltulose | | 5000 | | 2000 |
| 6 | 90% isomaltulose 10% glucose syrup | 500 | 4500 | | 1800 |
| 7 | 80% isomaltulose 20% glucose syrup | 1000 | 4000 | | 1600 |
| 8 | 70% isomaltulose 30% glucose syrup | 1500 | 3500 | | 1400 |
| 9 | 60% isomaltulose 40% glucose syrup | 2000 | 3000 | | 1200 |
| 10 | 100% isomaltulose | | 5000 | | 2000 |
| 11 | isomaltu.:sucr:DE40 - 60:20:20 | 1000 | 3000 | 1000 | 1400 |
| 12 | isomaltu. sucr:DE40 - 50:30:20 | 1000 | 2500 | 1500 | 1400 |
| 13 | 100% isomaltulose | | 2000 | | 800 |
| 14 | 90% isomaltulose 10% sucr. | | 1800 | 200 | 800 |
| 15 | 80% isomaltulose 20% sucr. | | 1600 | 400 | 800 |

TABLE 1-continued

Recipes

| trial | designation | glucose syrup | isomaltulose | sucrose | added water |
|---|---|---|---|---|---|
| 16 | 70% isomaltulose 30% sucr. | | 1400 | 600 | 800 |
| 17 | 100% isomaltulose 125° C. | | 2000 | | 800 |
| 18 | 100% isomaltulose 145° C. | | 5000 | | 2000 |

Legend:
Isomaltu. stands for isomaltulose, sucr. stands for sucrose, DE40 denotes a glucose syrup with dextrose equivalent 40, EHM is an extra-high maltose syrup, trials 1 to 3 and 18 are reference trials not according to the invention, Quantities of components in g.

TABLE 3

Results II

| | | stability after 3 days at 30° C./70% rH | |
|---|---|---|---|
| trial | designation | % weight gain | assessment |
| 1 | reference sucrose/glucose | 5.92 | shiny to dull, advanced deliquescence |
| 2 | 30% isomaltulose 20% sucr. 50% syrup (EHM) | 6.03 | dull, advanced deliquescence |
| 3 | 30% isomaltulose 35% sucr. 35% syrup (EHM) | 6.39 | dull, incipient deliquescence |
| 4 | 100% isomaltulose | 0.15 | dry, advanced recrystallisation |
| 5 | 100% isomaltulose - | 0.14 | dry, advanced recrystallisation |

TABLE 2

Process parameters and results I (immediately after production)

| trial | designation | max. T [° C.] | pressure [bar] | duration [min] | water content | microcrystalline surface layer [μm] | isomaltulose recovery | comment |
|---|---|---|---|---|---|---|---|---|
| 1 | reference sucrose/glucose | 140 | 0.2 | 25 | 1.9% | | | normal consistency, slightly yellowish |
| 2 | 30% isomaltulose 20% sucr. 50% syrup (EHM) | 119 | 0.3 | 17 | 2.7% | | 100% | many air bubbles, but good colour and viscosity. |
| 3 | 30% isomaltulose 35% sucr. 35% syrup (EHM) | 120 | 0.2 | 15 | 2.2% | | 100% | yellowish, viscous mass, nevertheless well stampable with good surface |
| 4 | 100% isomaltulose | 120 | 0.25 | 16 | 2.8% | | 100% | thin, easy to stamp, few bubbles |
| 5 | 100% isomaltulose | 120 | 0.2 | 18 | 2.0% | | 100% | well stampable, crystal clear, similar to trial 4 |
| 6 | 90% isomaltulose 10% glucose syrup | 120 | 0.19 | 19 | 2.2% | 164 | 98% | good flowability, quite a few bubbles, good stampability |
| 7 | 80% isomaltulose 20% glucose syrup | 123 | 0.2 | 20 | 1.8% | | 97% | good stampability, normal viscosity, few bubbles. |
| 8 | 70% isomaltulose 30% glucose syrup | 121 | 0.18 | 19 | 1.9% | | 95% | good stampability, normal viscosity, few bubbles. |
| 9 | 60% isomaltulose 40% glucose syrup | 120 | 0.38 | 17 | 2.0% | 212 | 96% | foaming, larger bubbles, very viscous, stampable |
| 10 | 100% isomaltulose | 120 | 0.2 | 14 | 2.0% | 130 | 100% | crystal clear, normal viscosity, good stamping properties |
| 11 | isomaltu.:sucr: DE40-60:20:20 | 121 | 0.18 | 17 | 2.0% | | 100% | yellowish, well stampable |
| 12 | isomaltu. sucr: DE40-50:30:20 | 120 | 0.18 | 19 | 2.2% | | 100% | strong yellowish, well stampable |
| 13 | 100% isomaltulose | 119 | 0.19 | 14 | 2.6% | 155 | 100% | very thin, stampable |
| 14 | 90% isomaltulose 10% sucr. | 120 | 0.19 | 14 | 3.0% | | 100% | slightly yellowish, well stampable |
| 15 | 80% isomaltulose 20% sucr. | 120 | 0.2 | 18 | 2.9% | | 100% | yellowish, thin liquid, stampable |
| 16 | 70% isomaltulose 30% sucr. | 120 | 0.2 | 16 | 3.1% | | 100% | yellowish, well stampable |
| 17 | 100% isomaltulose 125° C. | 125 | 0.2 | 18 | 1.9% | | 89% | slightly yellowish, well stampable |
| 18 | 100% isomaltulose 145° C. | 145 | 1 | 14 | 2.3 | | 92.5% | strongly yellowish, well stampable |

TABLE 3-continued

Results II stability after 3 days at 30° C./70% rH

| trial | designation | % weight gain | assessment |
|---|---|---|---|
| 6 | 90% isomaltulose 10% glucose syrup | 0.91 | dull, dry, incipient recrystallisation |
| 7 | 80% isomaltulose 20% glucose syrup | 1.61 | glossy to dull, sticky, incipient recrystallisation |
| 8 | 70% isomaltulose 30% glucose syrup | 2.38 | shiny, sticky, incipient recrystallisation |
| 9 | 60% isomaltulose 40% glucose syrup | 3.21 | shiny, sticky, incipient recrystallisation |
| 10 | 100% isomaltulose | 0.37 | dull, dry, incipient recrystallisation |
| 11 | isomaltu.:sucr:DE40 - 60:20:20 | 3.51 | shiny, sticky, incipient recrystallisation |
| 12 | isomaltu. sucr:DE40 - 50:30:20 | 3.36 | shiny to dull, sticky, incipient recrystallisation |
| 13 | 100% isomaltulose | 0.28 | dull, dry, incipient recrystallisation |
| 14 | 90% isomaltulose 10% sucr. | 0.50 | dull, dry, incipient recrystallisation |
| 15 | 80% isomaltulose 20% sucr. | 0.67 | dull, dry, incipient recrystallisation |
| 16 | 70% isomaltulose 30% sucr. | 0.80 | dull, dry, incipient recrystallisation |
| 17 | 100% isomaltulose 125° C. | 0.88 | shiny to dull, sticky, incipient recrystallisation |

For the hard caramel after trials 6, 9, 10 and 13, the thickness of the microcrystalline surface layer was determined. Furthermore, the recovery of isomaltulose of trials 2 to 17 was determined by HPLC, showing that at an increased temperature (trial 17) during the process as well as at an increased proportion of glucose syrup in the hard caramel (trials 6 to 9) the recovery is lower.

In a subsequent stability test (Table 3) with the different hard caramels produced according to Table 1, it was found that the hard caramels of the reference trials 1 to 3 showed a clear increase in weight after the trial had been carried out, whereas the hard caramels of the trials 4 to 17 according to the invention showed a smaller increase in weight and did not deliquesce. Particularly advantageously, the hard caramels of trials 4, 5, 6, 10, 11 and 13 to 16 according to the invention remained dry, being characterised by a lack of glucose content or an isomaltulose: glucose syrup ratio of 90:10.

It is also shown that a hard caramel prepared at a higher temperature, namely 145° C., at atmospheric pressure, exhibits a strong undesirable dark colouring (browning) compared to a hard caramel of the same composition but different production method according to the invention (compare, for example, trial 10).

For the hard caramel according to trial 10, a layer thickness of 146 μm and a water content of 2.3% could be determined after 25 months of storage at 25° C. and 45% rH. The colour in solution was 13.5 IU. These hard caramels according to the invention are characterised by a very high storage and colour stability.

The invention claimed is:

1. A hard caramel containing isomaltulose in an amount of 50 to 100 wt. %, based on total dry substance of the hard caramel, the hard caramel having a core and a closed microcrystalline surface layer with a thickness of at most 1 mm wherein the hard caramel is prepared by a process, the process comprising the steps of:
   a) providing an aqueous medium containing isomaltulose in an amount of 50 to 100 wt. % based on total dry substance,
   b) applying a reduced pressure of at most 0.4 bar with mixing at a temperature of at most 130° C.,
   c) cooling the aqueous medium to a temperature of 70 to 90° C. at atmospheric pressure to obtain a plastic mass, and
   d) moulding the plastic mass obtained in step c) and obtaining an isomaltulose-containing hard caramel.

2. The hard caramel according to claim 1, wherein the isomaltulose in the core of the hard caramel is not completely crystallised.

3. The hard caramel according to claim 1, wherein the hard caramel has sucrose, glucose or sucrose and glucose in an amount of at most 40 wt. %, based on total dry substance of the hard caramel.

4. The hard caramel according to claim 1, wherein the hard caramel has a transparent core.

5. The hard caramel according to claim 1, wherein the hard caramel has no browning.

6. The hard caramel according to claim 1, wherein the hard caramel has a high storage stability, in particular a high shape stability.

7. A process for preparing an isomaltulose-containing hard caramel, comprising the steps of:
   a) providing an aqueous medium containing isomaltulose in an amount of 50 to 100 wt. %, based on total dry substance,
   b) applying a reduced pressure of at most 0.4 bar with mixing at a temperature of at most 130° C.,
   c) cooling the aqueous medium to a temperature of 70 to 90° C. at atmospheric pressure to obtain a plastic mass, and
   d) moulding the plastic mass obtained in step c) and obtaining an isomaltulose-containing hard caramel, wherein the hard caramel has a core and a closed microcrystalline surface layer with a thickness of 0.01 mm to 1 mm.

8. A hard caramel prepared by the process according to claim 7.

9. The process according to claim 7, wherein the aqueous medium provided in step a) is heated to a temperature of 80 to 125° C., before step b) in a process step a1).

10. The process according to claim 8, wherein the temperature in step b) is 110 to 130° C.

11. The process according to claim 8, wherein the mixing in step b) is continuous.

12. The process according to claim 8, wherein the plastic mass obtained in step c) has a water content of 1 to 4%.

13. The process according to claim 7, wherein the aqueous medium in step a) has sucrose in an amount of at most 40 wt. %, based on total dry substance.

14. The process according to claim 7, wherein the temperature in step b) is at most 125° C.

15. The process according to claim 7, wherein the aqueous medium provided in step a) is heated to a temperature of 85 to 100° C. before step b) in a process step a1).

16. The process according to claim 7, wherein the temperature in step b) is 120 to 125° C.

17. The process according to claim 7, wherein the plastic mass obtained in step c) has a water content of 1.5 to 2.5%.

18. The process according to claim 7, wherein the plastic mass obtained in step c) has a water content of 1.8 to 2.5%.

* * * * *